(12) United States Patent
Krause

(10) Patent No.: US 7,622,177 B2
(45) Date of Patent: Nov. 24, 2009

(54) COMPOSITE COMPONENT

(75) Inventor: Frank Krause, Bergisch Gladbach (DE)

(73) Assignee: Bayer MaterialScience AG, Leverkusen (DE)

( * ) Notice: Subject to any disclaimer, the term of this patent is extended or adjusted under 35 U.S.C. 154(b) by 486 days.

(21) Appl. No.: 11/210,188

(22) Filed: Aug. 23, 2005

(65) Prior Publication Data

US 2006/0046039 A1   Mar. 2, 2006

(30) Foreign Application Priority Data

Aug. 26, 2004 (DE) .................. 10 2004 041 685

(51) Int. Cl.
*B32B 3/00* (2006.01)

(52) U.S. Cl. .......... 428/57; 428/212; 428/593; 428/188; 428/594; 296/216.06; 296/216.09; 49/475.1; 49/495.1

(58) Field of Classification Search .......... 428/212, 428/113, 148, 188, 593; 296/216.06, 216.09; 49/475.1, 495.1
See application file for complete search history.

(56) References Cited

U.S. PATENT DOCUMENTS

| 4,113,905 | A | * | 9/1978 | Kessler ................ 428/34 |
| 4,272,578 | A | * | 6/1981 | Schegerin ............. 428/113 |
| 4,881,773 | A |   | 11/1989 | Ichinose ............... 296/216 |
| 6,458,301 | B1 | * | 10/2002 | Hendrix ................ 264/141 |
| 6,517,150 | B2 |   | 2/2003 | De Gaillard et al. ... 296/216.06 |
| 2002/0021032 | A1 |   | 2/2002 | De Gaillard et al. ... 296/216.09 |

FOREIGN PATENT DOCUMENTS

| DE | 43 30 030 C1 | 3/1995 |
| DE | 198 14 275 A1 | 10/1999 |
| DE | 199 43 772 C1 | 1/2001 |

OTHER PUBLICATIONS

Avallone et al. "Marks' Standard Handbook for Mechanical Engineers". McGraw-Hill, 10th ed. (1996). Section 6.*
Patent Abstracts of Japan Bd. 1996, Nr. 08, Aug. 30, 1996 & JP 08 086044 A (Takenaka Komuten Co Ltd; Sumitomo Osaka Cement Co Ltd; Sekigahara Seki) Apr. 2, 1996.
Patent Abstracts of Japan Bd. 017, Nr. 610 (M-1508), Nov. 10, 1993 & JP 05 185839 A (Nissan Motor Co Ltd), Jul. 27, 1993.
Patent Abstracts of Japan Bd. 012, Nr. 041 (M-666), Feb. 6, 1988 & JP 62 194980 A (Mazda Motor Corp), Aug. 27, 1987.
Patent Abstracts of Japan Bd. 1995, Nr. 02, Mar. 31, 1995 & JP 06 312620 A (Toyoda Gosei Co Ltd), Nov. 8, 1994.
Database WPI Section PQ, Week 200120 Derwent Publications Ltd., London, GB; AN 2001-197648 XP002392695 & JP 2001 018644 A (Komatsu Seisakusho KK) Jan. 23, 2001.

* cited by examiner

*Primary Examiner*—David R Sample
*Assistant Examiner*—Prashant J Khatri
(74) *Attorney, Agent, or Firm*—Connolly Bove Lodge & Hutz LLP

(57) ABSTRACT

A composite component comprising at least two parts that differ from one another in their respective coefficients of linear thermal expansion is disclosed. These parts are joined by at least one elastic connecting element having a height dimension and a thickness dimension and containing at least one shear element which is deformable in a shear-flexible manner. The height dimension relate to the thickness dimension in the range of 2 to 60. The inventive composite component is especially suitable for making glazing for automotive roofs.

10 Claims, 1 Drawing Sheet

COMPOSITE COMPONENT

FIELD OF THE INVENTION

The invention is directed to a composite component and in particular to a composite component that includes at least two parts having different coefficients of linear thermal expansion which are joined by means of at least one connecting element made of an elastic material.

SUMMARY OF THE INVENTION

A composite component comprising at least two parts that differ from one another in their respective coefficients of linear thermal expansion is disclosed. These parts are joined by at least one elastic connecting element having a height dimension and a thickness dimension and containing at least one shear element which is deformable in a shear-flexible manner. The height dimension relates to the thickness dimension in the range of 2 to 60. The inventive composite component is especially suitable for making glazing for automotive roofs.

BACKGROUND OF THE INVENTION

In the case of composite components made of a metal part and a plastics, e.g. molded, part which are connected to each other, the problem often arises that stresses or deformations occur due to the different coefficients of linear thermal expansion of the two materials. If, for example, polycarbonate sheets are used instead of glass for the glazing of vehicle roofs, the polycarbonate sheets exhibit substantially greater deformation when subjected to heat than do glass sheets, due to the very different coefficients of linear thermal expansion of polycarbonate and steel. Polycarbonate sheets are bonded to the steel roof of the vehicle using, for example, an adhesive, whereas glass sheets are generally fixed in place using clamping seals or an adhesive. When polycarbonate sheets expand under the effects of intense heating, the adhesive cannot compensate sufficiently for the linear thermal expansion and the sheets buckle. This problem of deformation does not occur with glass sheets due to the smaller difference between the coefficients of linear thermal expansion of glass and steel and the greater inherent rigidity of glass as compared with polycarbonate.

The object of the present invention is, therefore, to provide a composite element comprising at least two parts with different coefficients of linear thermal expansion, in particular a shaped part made of metal and a part made of plastics, e.g. a molded part, in which the parts are connected to each other in such a way that undesired deformations of the parts, in particular of the plastics part, as a result of the different linear thermal expansions of the parts is minimized, preferably prevented. At the same time, the external forces which occur such as, for example, the stresses caused by strong winds in the case of vehicle glazing, should absorbed so that deformation due to mechanical effects and the natural frequency characteristics are not impaired.

DETAILED DESCRIPTION OF THE INVENTION

Figure 1A:
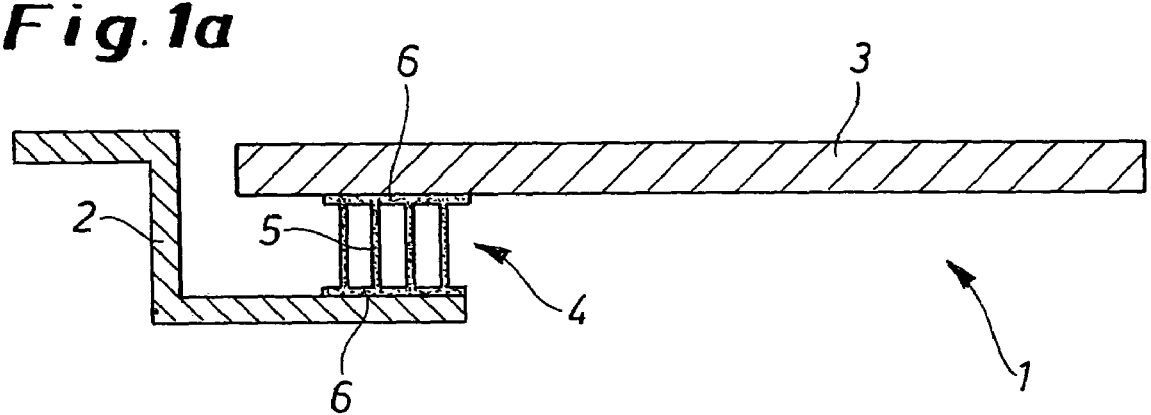
FIG. 1a is a schematic diagram of an embodiment of the connecting element according to the invention for connecting two parts.

The invention provides a composite component comprising at least two parts with different coefficients of linear thermal expansion which are connected by means of at least one connecting element made of an elastic material, wherein the connecting element has at least one shear element which is deformable in a shear-flexible manner and in which the ratio of height to thickness is in the range of 2 to 60.

The composite component according to the invention comprises at least two parts which have different coefficients of linear thermal expansion. The difference between the coefficients of linear thermal expansion is preferably at least $20 \times 10^{-6}$ $K^{-1}$ and at most $100 \times 10^{-6}$ $K^{-1}$.

At least one of the two parts may be made of e.g. metal, preferably steel, aluminium, magnesium, copper, titanium and/or an alloy of these metals. One of the two parts particularly preferably is steel.

At least one of the parts may be made of e.g. a plastic material, preferably polycarbonate, polymethylmethacrylate, ABS, ASA, polyamide, PBT, polypropylene or blends of these plastic materials. One of the parts particularly preferably is polycarbonate.

The parts may have any geometric shape. They may be, for example, sheets, half-shells or frame elements. One of the parts is preferably a part for a vehicle roof, made of steel with a cut-out for a window pane, and the other is another part comprising a sheet of polycarbonate for glazing the vehicle roof.

The parts are joined together by means of at least one connecting element made of an elastic material. The elastic material of the connecting element is preferably a plastic material, in particular a thermoplastic polyurethane (TPU), a thermoplastic elastomer (TPE), a rubber, a non-reinforced polyamide, PP and/or PE.

The connecting element has at least one shear element which is deformable in a shear-flexible manner and in which the ratio of height to thickness ranges from 2 to 60. Both terms height and thickness refer to the passive state in which no shear forces are being exerted on the shear element. The height of the shear element is regarded as the distance between the two connecting points for the shear element with the parts. If the shear element is located at right angles to the two parts, then the height of the shear element corresponds substantially to the spacing between the two parts within the connecting region. The thickness is taken to be the smaller of the two extents of the shear element located at right angles to the height. The thickness extends parallel to the displacement of the two parts with respect to each other, i.e. parallel to the direction of the shear force which is being exerted.

In principle, the parts may be connected to each other at any points, wherein they overlap each other in the connecting region. The parts may be arranged partially or totally, e.g. on top of each other. They may be arranged on top of each other in the edge regions of the parts, i.e. the edge regions of the parts overlap.

In the overlapping regions, the connecting element provides a shear-flexible connection of the two parts, because the connecting element according to the invention is made of an elastic material and is deformable in a shear-flexible manner and the ratio of its height to its thickness ranges from 2 to 60. A high ratio of height to thickness for the shear element facilitates greater shear-flexibility than does an adhesive. Thus, the connecting element according to the invention compensates for the different linear thermal expansion of the two parts when they are subjected to heat, thus avoiding undesirable deformations, e.g. buckling of the parts. According to the invention, this takes place by means of relative movement between the two parts with the comparatively low forces.

The shear element may be, for example, lamella-shaped or rod-shaped. In the case of a lamella-shaped shear element, the thickness corresponds to the wall-thickness of the shear element. In the case of a rod-shaped shear element with a substantially round cross-section, the thickness of the shear element corresponds to the diameter of the rod-shaped shear element. A rod-shaped shear element may for example also have a square cross-section. The thickness of the shear element then corresponds to the length of the edge of the cross-section. Other regular or irregular geometric shapes are possible, provided the ratio of height to thickness is 2 to 60. If the connecting element is built up from several shear elements, the shear elements may be identical or different.

In a first embodiment, the connecting element has lamella-shaped shear elements which are flexibly deformable in the direction of shear, but which transfer forces well in the direction at rights angles to that, i.e. in the direction of the lamellae. The lamella-shaped elements are pliable under the linear forces which occur during changes in temperature so that displacement of the two parts with respect to each other is enabled. This prevents undesirable deformations of the parts due to the different coefficients of linear thermal expansion. This embodiment may be designed in such a way, for example, that the lamella-shaped shear elements are connected to each other via end elements, wherein the end elements are each arranged at the upper and lower ends of the shear elements. The ends facing the parts are regarded as being the upper and lower ends of the shear elements. These types of end elements are shaped as strips, sheets or the like. Each end element is connected to one of each of the parts. An end element may be connected to a part by the use of, for example, glue, screws, rivets, clinches, etc.

In this embodiment, the connecting element may advantageously enable the production of a seal between the two parts in addition to connecting the two parts.

In another embodiment, the connecting element comprise rod-shaped shear elements. Similarly to the lamella-shaped shear elements, the elastic rod-shaped elements enable displacement of the two parts with respect to each other when subjected to shear stresses due to the effects of heat. This embodiment may be designed in such a way that, for example, the rod-shaped shear elements are connected to each other via end elements at their ends. Again, each end element is connected to one of the parts. An end element may be connected to a part by the use of, for example, glue, screws, rivets, clinches.

A combination of lamella-shaped elements and rod-shaped elements may also be used. Likewise, any modifications to the lamella shape or rod shape elements are possible, provided the elements produce sufficient stability and enable a shear-flexible connection. Depending on the shape and material of the parts, the connecting element must have sufficient stability to accommodate external forces (strong winds, oscillations). A larger number of shear elements may be provided in order to increase the stability, for example. The thickness of the shear elements also determines the stability. The thickness may also be varied, for example, via the height of the elements.

The number of shear elements, in particular the number of lamella-shaped shear elements, is preferably at least 2 and preferably at most 8. The spacing between the two parts being connected, and thus the height of a shear element, is prefer- ably at least 5 mm and preferably at most 30 mm. The thickness of a shear element, in particular a lamella-shaped shear element is preferably at least 0.5 mm and preferably at most 2.5 mm. The thickness of an end element is preferably at least 0.5 mm and preferably at most 4 mm. If the connecting element includes end elements in addition to shear elements, then the height of the shear elements is reduced by the thickness of the end elements. The height of the shear elements and the thickness of the end elements together give the spacing between the two parts, i.e. the height of the entire connecting element.

The connecting element in the composite component according to the invention may be produced, for example, by extrusion. However, the connecting element may also be produced from different injection-molded and/or extruded parts which are then connected together by welding or gluing.

One embodiment of the composite component according to the invention refers to the glazing of vehicle roofs. In this case, the roof of the vehicle, made of steel, forms one of the parts and the window, made of polycarbonate, forms a second part. The polycarbonate window is inserted into the roof of the vehicle in a frame. Over an edge region within which the steel frame and the polycarbonate window overlap, the two parts are connected together by means of the shear-flexible, deformable connecting element according to the invention made of an elastic material, in particular a thermoplastic polyurethane, a thermoplastic elastomer or rubber. A connecting element is preferably provided on each of the four edges of the polycarbonate window.

The invention is explained in more detail below, in reference to the FIGS. 1a and 1b. mold A schematic diagram of an embodiment of the composite component 1 according to the invention is shown in FIG. 1a. A part 2, e.g. a frame from a vehicle roof made of steel and a part 3, e.g. a window made of polycarbonate, are connected by means of connecting element 4. The two parts 2, 3 have different coefficients of linear thermal expansion. The connecting element 4 is made of an elastic material, e.g. thermoplastic polyurethane (TPU), and is deformable in a shear-flexible manner. In the embodiment shown, connecting element 4 has lamella-shaped shear elements 5 which are pliable under the linear forces present during a change in temperature. The lamella-shaped shear elements 5 are stable under tensile stresses. The upper and lower ends of lamella-shaped elements 5, i.e. the ends facing the parts 2, 3, are connected to each other via end elements 6. Each of the end elements 6 is connected to one of the parts 2, 3.

Figure 1B:
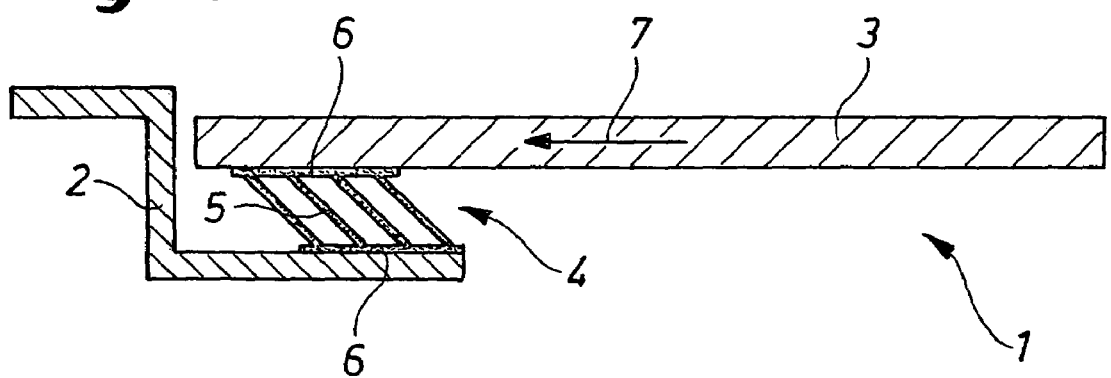
FIG. 1b is a schematic diagram of the connecting element in FIG. 1a under shear stress.

As shown schematically in FIG. 1b, shear occur when the temperature changes and produces a displacement (indicated by arrow 7) of the two parts with respect to each other without undesirable deformations of the parts 2, 3 taking place.

EXAMPLES

Example 1

The deformation due to thermal expansion of a polycarbonate window in a steel frame was determined mathematically using a two-dimensional model of a vehicle roof module. In the comparison example, the polycarbonate window was glued to a steel frame. In the example representing the invention, the polycarbonate window 3 was connected to a steel frame 2 by means of a connecting element 4 with 4 lamella-shaped shear elements 5, in a manner similar to that shown in FIG. 1a. Table 1 below summarizes the mathematically determined values for deformation and stress upon subjection of the composite component to a temperature difference of 100 K.

TABLE 1

| Type of connection | Max. deformation [mm] | Max. stress [MPa] |
| --- | --- | --- |
| Glue (comparison example) | 38.8 | 1.7 |
| Connecting element (invention) | 0.4 | 0.06 |

Example 2

The deformation due to thermal expansion of a polycarbonate window in a steel frame was determined mathematically using a three-dimensional model of a vehicle roof module. In the comparison example, the polycarbonate window was glued to a steel frame. In the working example, the polycarbonate window 3 was connected to a steel frame 2 by means of a connecting element 4 with 4 lamella-shaped shear elements 5, in a manner similar to that shown in FIG. 1*a*. Table 2 below summarises the mathematically determined maximum deformation values upon subjection of the composite component to a temperature difference of 100 K.

TABLE 2

| Type of connection | Max. deformation [mm] |
| --- | --- |
| Glue (comparison example) | 9.7 |
| Connecting example (Invention) | 2.3 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composite glazing component comprising at least two parts that differ from one another in their respective coefficients of linear thermal expansion by at least $20\times10^{-6}$ $K^{-1}$, and at least one elastic connecting element being directly and fixedly connected to and joining said parts, said connecting element having a height dimension and a thickness dimension and containing at least one shear element which is deformable in a shear-flexible manner, said height dimension relate to said thickness dimension in the range of 2 to 60.

2. The composite component according to claim 1, wherein the shear element is lamella-shaped.

3. The composite component according to claim 1, wherein the shear element is rod-shaped.

4. The composite component according to claim 1 wherein the connecting element is a polymeric material.

5. The composite component of claim 4 wherein the material contains at least one member selected from the group consisting of thermoplastic polyurethane, a non-reinforced polyamide, polypropylene and polyethylene.

6. The composite component according to claim 1 characterised in that one part is made of a metal.

7. The composite component of claim 6 wherein the metal is a member selected from the group consisting of steel, aluminium, magnesium, copper, titanium and any alloy of any of these.

8. The composite component according to claim 1 wherein one part is made of a polymeric material.

9. The composite component of claim 8 wherein the material is at least one member selected from the group consisting of polycarbonate, polymethylmethacrylate, ABS, ASA, polyamide, PBT, and polypropylene.

10. The composite glazing component according to claim 1, wherein the at least one elastic connecting element is connected to the at least two parts by one or more selected from the group consisting of glue, screws, rivets, clinches and combinations thereof.

* * * * *